United States Patent Office 3,398,042
Patented Aug. 20, 1968

3,398,042
LEATHER LAMINATES
Julius Peter Odenthal, Bezirk Cologne, and Erwin Müller, Leverkusen, Germany, assignors to Farbenfabriken Bayer Aktiengesellschaft, Leverkusen, Germany, a German corporation
No Drawing. Filed Jan. 2, 1963, Ser. No. 248,860
Claims priority, application Germany, Jan. 5, 1962,
F 35,720
7 Claims. (Cl. 161—190)

The invention relates to laminated leather products and to a process of producing same. More particularly this invention relates to a process for laminating leather without losing any of the advantageous properties of natural leather.

Artificial or simulated synthetic leather substitutes are well known and much effort has been expended in an effort to adapt synthetic polymers as substitutes for leather. Artificial leathers based on synthetic plastics are such as, for example, polyvinyl chloride, nitrocellulose, acrylic acid esters, polyvinyl acetate, polyisobutylene and the like. Artificial leathers based on the plasticized and cross-linked elastomers are such as, for example, butadiene-styrene copolymers, butadiene-acrylonitrile copolymers and the like usually combined with reinforcing fillers such as, for example, highly active silicic acid. Natural rubber is still another known substitute for leather. The synthetically manufactured leather substitutes mentioned above are comparable in some respects to natural leather but it has been difficult to produce a leather substitute with vapor and air permeability properties equivalent to those of natural leather. One of the most important properties of natural leather is its vapor and air permeability or its ability to "breathe."

When leather is bonded to itself or to other pervious supports such as, for example, textiles, and the like, the vapor permeability is again lost by the use of impermeable adhesives such as those made from natural rubber, polychloroprene, butadiene-acrylonitrile copolymers, nitrocellulose and the like. These adhesives have desirable adhesive properties and impart water-tightness to the leather, but do not possess favorable vapor or air permeability characteristics.

It is an object of this invention to provide a leather laminate having the properties of natural leather. It is another object of this invention to provide a process for laminating leather to itself or to another porous substrate. It is still another object of this invention to provide a bonding agent for use as a leather adhesive. It is a further object of this invention to provide a leather laminate having vapor and air permeability values comparable to those of natural unbonded leather. It is still a further object of this invention to provide a leather adhesive capable of improved bond strength, excellent water tightness and improved steam, vapor and air permeability than heretofore available leather adhesives. It is another further object of this invention to provide a leather adhesive having vapor and air permeability values comparable to those of natural leather.

The foregoing objects and others which will become apparent from the following description are accomplished in accordance with this invention, generally speaking, by providing a leather laminated to itself or to another porous substrate by a solution in organic solvents of an adhesive having vapor and air permeable characteristics similar to that of natural leather and prepared by reacting a water-soluble organic dihydroxy compound with a molecular weight within the range of from about 500 to about 3000 and an hydroxyl number within the range of from about 200 to about 35, with less than an equivalent quantity of a polyisocyanate required to react with all of the hydroxyl groups of the water-soluble organic dihydroxy compound. While it is not always essential it is desirable in many instances to use a chain extending agent in addition to the water-soluble organic dihydroxy compound and the polyisocyanate. Then the amount of polyisocyanate is less than the equivalent quantity required to react with the active hydrogen atoms of the dihydroxy compound and of the chain extending agent.

Thus, this invention provides a process for preparing leather laminates or laminates of leather with other porous materials by means of a polyurethane adhesive dissolved in a suitable solvent and applied to one of the materials after which the other material is bonded thereto.

Any suitable water-soluble organic dihydroxy compound can be used in the practice of the present invention such as, for example, polyethylene oxides, polyacetals, and water-soluble polyesters having the molecular weight and hydroxyl number set forth.

Any suitable polyacetal may be used, such as, those obtained by reacting formaldehyde with diethylene glycol or a polyethylene glycol having a molecular weight of from about 500 to about 3000.

Any suitable water-soluble polyester can also be used, such as, for example, those obtained by esterifying diethylene and polyethylene glycols with dicarboxylic acids or aliphatic polycarbonates based on diethylene and polyethylene glycols, such as, for example, the polyester from 1.1 mol octaethylene glycol and 1 mol of adipic acid, the polyester from 1.1 mol of hexaethylene glycol and 1 mol of diphenyl carbonate, the polyester from 1.2 mol octaethylene glycol and 1 mol of maleic acid.

Any suitable dicarboxylic acids may be used in the preparation of the water-soluble polyesters, such as, for example, adipic acid, succinic acid, maleic acid, fumaric acid, methyl succinic acid, di-, tri- and tetra-methyl succinic acids, pimelic acid, glutaric acid, suberic acid, azelaic acid, sebacic acid, mixtures thereof and the like.

Any suitable organic polyisocyanates may be used in the preparation of the polyurethane leather adhesive of the present invention, such as, for example, aliphatic, aromatic, alicyclic and heterocyclic polyisocyanates, including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 4,4'-dimethyl diphenylmethane diisocyanate, 2,2-diphenylpropane-4,4'-diisocyanate, p-phenylene diisocyanate, m-phenylene diisocyanate, xylylene diisocyanate, 1,4-naphthalene diisocyanate, 1,5-naphthalene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidine diisocyanate, and the like. Aromatic diisocyanates are preferred. Toluylene diisocyanate and 4,4'-diphenylmethane diisocyanate are particularly preferred.

Any suitable chain extending agent having active hydrogen containing groups reactive with isocyanate groups and having a molecular weight less than about 500 can be used, such as, for example, water, glycols, diamines, amino-alcohols and the like, such as, for example, ethylene glycol, propylene glycol, butylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methylcyclohexane), hexanediol, thiodiglycol, ethylene diamine, propylene diamine, butylene diamine, hexamethylene diamine, cyclohexylene diamine, phenylene diamine, toluylene diamine, xylylene diamine, 3,3'-dichlorobenzidine, 3, 3'-dinitrobenzidine, ethanol amine, aminopropyl alcohol, 2,2-dimethyl propanol amine, 3-aminocyclohexyl alcohol, p-amino benzyl alcohol, glycerine, trimethylol propane, hexanetriol, pentaerythritol and the like.

It is often advantageous to carry out the reaction in the presence of a catalyst. Any suitable catalyst may be used, such as, for example, dibutyl tin di-2-ethyl hexoate, stannous octoate, dibutyl tin dilaurate, triethylene diamine, N-ethyl morpholine, N-methyl morpholine, dimethyllauryl amine, ferric acetylacetonate, mixtures thereof and any other catalyst which will promote the reaction between isocyanate groups and active hydrogen atoms as determinable by the Zerewitinoff method such as those disclosed in "Catalysis of the Isocyanate-Hydroxyl Reaction," J. W. Britain and P. G. Gemeinhardt, Journal of Applied Polymer Science, volume IV, issue No. 11, pages 207–211, (1960).

In practicing the present invention in its preferred form, the adhesive to be employed as a bonding agent for leather and a suitable porous substrate whether the substrate be another piece of leather, a textile or the like, is prepared by reacting a water-soluble organic dihydroxy compound, a chain extending agent, and an organic polyisocyanate, after which this reaction product is applied in solution form to one of the porous substrates being bonded prior to bonding the other porous substrate thereto. The leather adhesive can be dissolved in a solvent to make is easier to apply or the reaction can take place in the presence of a solvent. When the adhesive is in solution form, whether the reaction takes place in the presence of a solvent or the adhesive is dissolved in a solvent after the reaction occurs, a cross linking agent can be added. The leather laminate demonstrates outstanding bond strength, excellent water tightness, and improved vapor and air permeability comparable to the values exhibited by natural leather alone.

The polyurethane adhesive can be dissolved in a suitable solvent to aid in applying a thin coating to the untreated leather prior to bonding to a porous substrate. Suitable solvents include, for example, chlorinated hydrocarbons, such as, trichloroethylene; dimethyl ketone, methylethyl ketone, cyclohexanone; glycol methylether acetate, dimethyl formamide, methylene chloride, ethyl acetate, butyl acetate.

It is preferred that the solid concentration of the adhesive in solution be within the range of from about 5% to about 30% by weight and more particularly within a range of from about 15% to about 25% by weight.

When the adhesive is dissolved in a solvent a cross-linking agent may be added. Any suitable cross-linking agent, such as, for example, isocyanates of higher valency can be used, such as, for example, butane-1,2,2-triisocyanate, benzene - 1,3,5 - triisocyanate, diphenyl-2,4,4'-triisoycanate, diphenyl - 4,6,4' - triisocyanate, toluene - 2,4, 6 - triisocyanate, ethyl benzene - 2,4'6 - triisocyanate, triphenylmethane - 4,4',4'' - triisocyanate, monochlorobenzene - 2,4,6 - triisocyanate, 4,4',4'' - triisocyanatophenyl thiophosphate, the addition products of 3 mols toluylene diisocyanate and 1 mol trihydric alcohol and the like. The amount of polyisocyanate added to permit cross linking is—in contrast to the amount of polyisocyanate reacted first with the dihydroxy compound—now in excess over the remaining hydroxyl groups of the adhesive and may range from 1 to 10 percent by weight of the adhesive (solid content of the solution).

The adhesive can be applied to the leather in any desired manner, such as, for example, by brushing on or by spraying.

The process of this invention is particularly suitable for preparing leather laminates having vapor and air permeability values comparable to those of natural unbonded leather. Any type of leather can be used when practicing the present invention, however, the adhesive is particularly helpful in preparing unions of split leathers to themselves or other porous materials such as, for example, textiles and the like.

The leather laminates can be used for making luggage, brief cases, shoe soles, shoe uppers, shoe caps and for assembling leather parts for shoes, leather coats and trousers. They are further useful as leather covers in upholstery.

The invention is illustrated but not limited by the following examples in which the parts are by weight unless otherwise indicated.

EXAMPLE 1

About 40,000 parts of a water soluble polyacetal, having an hydroxyl number of 78 and prepared from a mixture of triethylene and tetraethylene glycols (OH-number 640) and paraformaldehyde is dehydrated at 100°/12 mm. and reacted with about 5040 parts of a mixture of about 20 percent 2,6-toluylene diisocyanate and about 80 percent 2,4-toluylene diisocyanate. From this amount of diisocyanate 5% are fed up by side reactions, e.g. with traces of water strongly absorbed by the hydrophilic polyacetal. The reaction product contains terminal hydroxyl groups.

About 10 parts by volume of dibutyl-tin dilaurate are also added while stirring. An exothermic reaction takes place with considerable rise in viscosity. The melt is poured at about 35° C. to about 40° C. onto metal sheets and further heated for 8 hours at 100° C. The result is a rubber-like material with a Defo value at 80° C. of 200/15.

Using the above reaction product, the following mixture C is prepared on a roller. The following mixtures A and B based on natural rubber and polychloroprene respectively are used for comparison.

|  | A | B | C |
|---|---|---|---|
| Natural rubber | 100 | | |
| Polychloroprene, strongly crystallizing | | 100 | |
| Reaction product | | | 100 |
| Stearic acid | 1 | 1 | 1 |
| Highly active precipitated silica | 15 | 15 | 15 |
| Magnesium Oxide | | 10 | |
| Non-discoloring age resister | 0.5 | 0.5 | |

The mixture A is dissolved in benzine having a boiling point of about 90° C. to about 110° C., the mixture B is dissolved in a 1:1 mixture of toluylene and trichloroethylene and the mixture C is dissolved in methylethyl ketone. The solid content of the solutions is about 25 to about 30%.

To about 100 parts of the mixtures A, B and C there is added about 25 parts of a 20% solution of 4,4',4''-triisocyanatotriphenylthiophosphate in methylene chloride. These solutions are coated onto an untreated leather with a thickness of about 1 mm. They are allowed to dry for a short time and in each case two pieces of leather are stuck together. After a setting time of 2, 6 and 10 days at room temperature, the following separation strengths in kg./cm.$^2$ are established:

| Days | A | B | C |
|---|---|---|---|
| 2 | 3.0 | 7.6 | [1] 3.3 |
| 6 | 3.6 | 9.5 | [1] 3.9 |
| 10 | 3.9 | 11.0 | [1] 3.7 |

[1] Structural crack.

The steam permeability is determined at 20° C. and a pressure drop from 100% to 20% relative air humidity on a measuring surface of 38.4 cm.$^2$. The following absolute values were obtained for the permeability (mg. $H_2O$):

| Hours | A | B | C |
|---|---|---|---|
| 0 | | | |
| 6 | 200 | 150 | 900 |
| 12 | 250 | 200 | 2,900 |
| 18 | 300 | 250 | 4,900 |
| 24 | 350 | 300 | 6,950 |

The steam permeability measured at $$\frac{10^{-8} \text{ g.}}{\text{cm.} \times \text{h.} \times \text{mm. Hg}}$$

wherein
g.=grams
h.=hours
cm.=centimeters
is therefore:

A _____ About 500–700
B _____ About 700–800
C _____ About 12,000–20,000

Untreated split leather of the same thickness gave a value of about 35,000.

EXAMPLE 2

About 180 parts of a mixture of about 20 percent 2,6-toluylene diisocyanate and 80 percent 2,4-toluylene diisocyanate is reacted with about 1000 parts of a polyethylene oxide having an OH-number of about 132 and about 0.2 part by volume tin-dibutyl dilaurate. There is considerable increase in viscosity with an exothermic reaction. The melt is heated for about 24 hours at about 100° C. and then shows a Mooney viscosity (ML 4' 100° C.) of 15.

About 100 parts of the above reaction product are mixed on a roller with about 1 part of stearic acid and about 15 parts of highly active precipitated silica. The mixture is then dissolved in trichloroethylene and mixed with 4,4'4''-triisocyanato-triphenylthiosphosphate as in Example 1.

Pieces of split leather are coated with the solution and pressed at room temperature. The separation strength after 2 days is about 6.2 kg./cm.$^2$ (structural crack), and the steam permeability is about 24,900 to about 30,040 10$^{-8}$ g./cm. h. mm. Hg. The split leather comparative sample of the same thickness shows values of 27,800 to about 30,120.

It is to be understood that any suitable organic polyisocyanate, water-soluble organic dihydroxy compound, chain extending agent, and the like described herein can be substituted for the particular ones employed in the preceding examples with satisfactory results providing the teachings of the preceding disclosure are followed.

Although the invention has been described in considerable detail in the foregoing for the purposes of illustration, it is to be understood that such detail is solely for this purpose and that variations can be made therein by those skilled in the art without departing from the spirit and scope of the invention except as set forth in the claims.

What is claimed is:

1. Leather bonded to a porous substrate by means of an adhesive, said adhesive when set having vapor and air permeability characteristics similar to that of natural leather, and comprising the non-foaming reaction product of a water-soluble organic dihydroxy compound selected from the group consisting of polyethylene oxides, polyacetals and polyesters, said organic compound having a molecular weight within the range of from about 500 to about 3000 and an hydroxyl number within the range of from about 225 to about 35 with less than an equivalent quantity of polyisocyanate than that required to react with all of the hydroxyl groups of the water-soluble organic dihydroxy compound.

2. A process for bonding leather to a porous substrate which comprises coating at least one of the substrates prior to bonding the other porous substrate thereto with a solution of the non-foaming reaction products of a water-soluble organic dihydroxy compound selected from the group consisting of polyethylene oxides, polyacetals and polyesters, said organic compound having a molecular weight within the range of from about 500 to about 3000 and an hydroxyl number of from about 200 to about 25 with less than an equivalent quantity of polyisocyanate than required to react with all of the hydroxyl groups of the dihydroxy compound in an organic solvent inert to the polyurethane reactants and applying the other substrate being bonded to the coated surface.

3. The process of claim 2 wherein the organic dihydroxy compound is polyethylene oxide.

4. The process of claim 2 wherein the organic dihydroxy compound is a polyacetal.

5. The process of claim 2 wherein the organic dihydroxy compound is a polyester.

6. A process for bonding leather to a porous material which comprises coating at least one of the substrates prior to bonding the other thereto with a non-foaming adhesive prepared by a process which comprises reacting a water-soluble organic dihydroxy compound selected from the group consisting of polyethylene oxides, polyacetals and polyesters, said organic compound having a molecular weight of from about 500 to about 3000 and an hydroxyl number of from about 200 to about 35, a chain extending agent, and less than an equivalent quantity of organic polyisocyanate, dissolving said adhesive in an inert solvent therefor and adding a cross linking agent to the solution, and applying the other substrate being bonded to the coated surface.

7. A laminated product comprising a layer of leather and a layer of a porous material bonded together by a polyurethane plastic comprising the non-foaming reaction product of a water-soluble organic dihydroxy compound selected from the group consisting of polyethylene oxides, polyacetals and polyesters, said organic compound having a molecular weight of from about 500 to about 3000 and an hydroxyl number of from about 200 to 35 with less than an equivalent quantity of an organic polyisocyanate than that required to react with all of the hydroxyl groups of the water-soluble organic dihydroxy compound.

References Cited

UNITED STATES PATENTS

| | | |
|---|---|---|
| 2,723,935 | 11/1955 | Rodman. |
| 2,843,568 | 7/1958 | Benning. |
| 2,955,056 | 10/1960 | Knox. |
| 2,970,119 | 1/1961 | Caldwell. |
| 3,000,757 | 9/1961 | Johnston et al. |
| 3,030,249 | 4/1962 | Schollenberger et al. |
| 3,116,501 | 1/1964 | Markevitch. |
| 2,430,479 | 11/1947 | Prat et al. _____ 161—190 X |

EARL M. BERGERT, *Primary Examiner.*

CLIFTON B. COSBY, *Assistant Examiner.*